United States Patent
Esbelani et al.

(10) Patent No.: US 12,097,556 B2
(45) Date of Patent: Sep. 24, 2024

(54) METHOD OF PRODUCING A COMPOSITE PRODUCT COMPRISING CEMENTED CARBIDE TILES

(71) Applicant: SANDVIK SRP AB, Svedala (SE)

(72) Inventors: Hodin Esbelani, Svedala (SE); Bengt-Goran Olsson, Svedala (SE)

(73) Assignee: SANDVIK SRP AB, Svedala (SE)

( * ) Notice: Subject to any disclaimer, the term of this patent is extended or adjusted under 35 U.S.C. 154(b) by 0 days.

(21) Appl. No.: 17/924,042

(22) PCT Filed: May 11, 2020

(86) PCT No.: PCT/EP2020/063021
§ 371 (c)(1),
(2) Date: Nov. 8, 2022

(87) PCT Pub. No.: WO2021/228357
PCT Pub. Date: Nov. 18, 2021

(65) Prior Publication Data
US 2023/0173575 A1    Jun. 8, 2023

(51) Int. Cl.
*B22D 19/04*    (2006.01)
*C22C 1/051*    (2023.01)

(52) U.S. Cl.
CPC ............. *B22D 19/04* (2013.01); *C22C 1/051* (2013.01)

(58) Field of Classification Search
CPC ............................................... B22D 19/00–06
See application file for complete search history.

(56) References Cited

U.S. PATENT DOCUMENTS
4,101,318 A    7/1978    Rudy

FOREIGN PATENT DOCUMENTS
JP    H0679434 A    3/1994
JP    H09308957 A    7/1997

OTHER PUBLICATIONS

English machine translation of Yokoki JP H0679434 (Year: 1994).*

* cited by examiner

*Primary Examiner* — Kevin P Kerns
*Assistant Examiner* — Steven S Ha
(74) *Attorney, Agent, or Firm* — Corinne R. Gorski

(57) ABSTRACT

A method of producing a composite product having cemented carbide tiles embedded in a metal surface thereof, a cemented carbide tile suitable for use in the method and a composite product including such cemented carbide tiles is provided. A mould for casting the product is prepared. Cemented carbide tiles having through holes or recesses are placed at desired surfaces of the mould and secured to the desired surfaces of the mould by fastening elements, such as nails or pins, such that at least part of an elongated body of each respective fastening element protrudes out from respective openings of each through hole or recess facing the mould surface and into the material of the mould to secure the respective cemented carbide tiles in place. Molten metal is poured into the mould to cast the composite product, the casting of which is removed after solidification.

6 Claims, 9 Drawing Sheets

METHOD OF PRODUCING A COMPOSITE PRODUCT COMPRISING CEMENTED CARBIDE TILES

RELATED APPLICATION DATA

This application is a § 371 National Stage Application of PCT International Application No. PCT/EP2020/063021 filed May 11, 2020.

FIELD OF INVENTION

The present disclosure relates generally to a method of producing a composite product comprising cemented carbide tiles embedded in a metal surface of the product, a cemented carbide tile suitable for use in the method and a composite product comprising cemented carbide tiles embedded in a metal surface of the product.

BACKGROUND ART

In the production of composite products comprising cemented carbide tiles embedded in the metal surfaces thereof it is imperative that the placement and fastening of the cemented carbide tiles is done correctly in order to secure the cemented carbide tiles in a mould used therefore prior to casting of the composite products.

Fastening of the cemented carbide tiles in the mould is critical for the final product and its performance in the sense that if the cemented carbide tiles are misplaced during pouring of molten metal into the mould the final product might need to be discarded or will underperform during use.

The fastening of cemented carbide tiles in the mould is currently done in different ways. One way is using nails, where enlarged heads of a plurality of such nails are used to secure the tiles through being arranged at the periphery thereof such that the enlarged grips the edges of the tiles.

Another way is by using bent or angled pins connecting to the mould surface at the periphery of the tiles with the bent or angled parts thereof gripping the tiles to secure them. Other alternatives used include hanging the tiles in chicken wire which in turn is secured to the mould surface, e.g. by nails, pins, staples or similar fasteners, or gluing the tiles to the mould surface.

Misplacement of the cemented carbide tiles will occur if the fastening of the tiles is poor, which increases the risk of flushing of the cemented carbides by the liquid metal during casting of the composite product. The above examples of fastening alternatives currently relied on suffer to some degree from being unreliable and potentially unstable why misplacement of the cemented carbide tiles during pouring may occur. Thus, there is a need for improved solutions for correct and stable fastening of the cemented carbides in the mould during such casting.

SUMMARY OF THE INVENTION

An object of the present invention is to provide an improved method of producing a composite product comprising cemented carbide tiles embedded in a metal surface of the product.

According to a first aspect this is provided through the process of: preparing a mould corresponding to a geometry of the product; placing cemented carbide tiles having through holes or recesses at desired surfaces of the mould, such that an opening of each through hole or recess faces a mould surface, and upon placing the cemented carbide tiles, securing the cemented carbide tiles to the desired surfaces of the mould by fastening elements, having a first and a second end section and an elongated body therebetween, such that the second end section and at least part of the elongated body of each respective fastening element protrude out from said respective opening of each through hole or recess facing the mould surface and into the material of the mould to secure the respective cemented carbide tile in place; and pouring molten metal into the mould to cast the composite product; and removing the casting after solidification.

Thus, the above method allows for a stable and robust fastening of the cemented carbide tiles that will decrease the risk of flushing considerably, if not eliminating the risk, thus increasing the yield and quality of the resulting composite product.

In a first alternative embodiment the method comprises using, when the cemented carbide tiles have through holes, fastening elements where each respective first end section has a cross-section exceeding a cross-section of an associated through hole, and the fastening comprises passing the second end section of the respective fastening elements through a respective hole and into the material of the mould to secure each respective fastening element, such that it is retained at the mould surface by the first end section and at least part of the elongated body of the fastening element.

In a second alternative embodiment the method comprises using, when the cemented carbide tiles have recesses, fastening elements where each respective first end section has a cross-section corresponding to a cross-section of a bottom of an associated recess, and affixing a respective fastening element at the bottom of an associated recess by its first end section, such that at least part of the elongated body and the second end section of the respective fastening element protrude out of its respective recess, and the fastening comprises inserting at least part of the elongated body and the second end section of the respective fastening elements into the material of the mould to secure each respective fastening element, such that it is retained at the mould surface by the second end section and at least part of the elongated body of the fastening element.

In a further embodiment the method comprises producing the cemented carbide tiles having the through holes or recesses by the process of: mixing carbide and binder material powder; putting the mixed carbide and binder material powder into a tile shaped mould having form elements to produce one or more through holes or recesses and pressing the mixed carbide and binder material powder into forming a green body having one or more through holes or recesses; sintering the green body such that the binder melts and binds together the carbide forming a cemented carbide tile having one or more through holes or recesses.

In an additional embodiment the method comprises producing the cemented carbide tiles having the through holes or recesses by the process of: mixing carbide and binder material powder; putting the mixed carbide and binder material powder into a tile shaped mould and pressing the mixed carbide and binder material powder into forming a green body; machining one or more through holes or recesses in the green body; sintering the green body such that the binder melts and binds together the carbide forming a cemented carbide tile having one or more through holes or recesses.

In a still further embodiment the method comprises producing the cemented carbide tiles having the through holes or recesses by the process of:

mixing carbide and binder material powder; 3-D printing the mixed carbide and binder material powder into a tile shape green body having one or more through holes or recesses; sintering the green body such that the binder melts and binds together the carbide forming a cemented carbide tile having one or more through holes or recesses.

According to a second aspect there is provided a cemented carbide tile having one or more through holes or recesses and suitable for use in the above method.

In a first embodiment this cemented carbide tile is obtainable by the process of: mixing carbide and binder material powder; forming, from the mixed carbide and binder material powder, a tile shaped green body having one or more through holes or recesses; sintering the tile shaped green body having the one or more through holes or recesses such that the binder melts and binds together the carbide forming the cemented carbide tile having the one or more through holes or recesses.

In a further embodiment the forming, by which the cemented carbide tile is obtainable, from the mixed carbide and binder material powder, of the tile shaped green body having the one or more through holes or recesses further comprises: putting the mixed carbide and binder material powder into a tile shaped mould that has form elements to produce one or more through holes or recesses and pressing the mixed carbide and binder material powder into forming the tile shaped green body having the one or more through holes or recesses.

In a first alternative embodiment the forming, by which the cemented carbide tile is obtainable, from the mixed carbide and binder material powder, of the tile shaped green body having the one or more through holes or recesses further comprises: putting the mixed carbide and binder material powder into a tile shaped mould and pressing the mixed carbide and binder material powder into a tile shaped green body; and machining one or more through holes or recesses in the tile shaped green body thus forming the tile shaped green body having the one or more through holes or recesses.

In a second alternative embodiment the forming, by which the cemented carbide tile is obtainable, from the mixed carbide and binder material powder, of the tile shaped green body having the one or more through holes or recesses further comprises: 3-D printing the mixed carbide and binder material powder into forming the tile shaped green body having the one or more through holes or recesses.

According to a third aspect there is provided a cemented carbide tile, that has a tile shaped body with one or more through holes or recesses, which tile shaped body is formed from a sintered tile shaped carbide and binder material powder mixture green body having the one or more through holes or recesses.

According to a fourth aspect there is provided a composite product comprising cemented carbide tiles embedded in a metal surface of the product that is obtainable by the above method.

According to a fifth aspect there is provided a composite product comprising cemented carbide tiles embedded in a metal surface of the composite product; that comprises: cemented carbide tiles having one or more through holes or recesses embedded in desired metal surfaces of the composite product, such that an opening of each respective through hole or recess faces outwards from the composite product surface.

Some of the above embodiments have the beneficial effects of providing for correct placement and fastening of cemented carbides in moulds prior to casting of composite products comprising cemented carbide tiles embedded in metal surfaces of the products, increasing the yield of correctly casted high-performance composite products.

Other of the above embodiments have the beneficial effects of providing for cemented carbide tiles enabled to be placed and fastened correctly in moulds prior to casting of composite products comprising cemented carbide tiles embedded in metal surfaces of the products, also enabling an increase in the yield of correctly casted high-performance composite products.

Still some of the above embodiments have the beneficial effects of providing for high-performance composite products comprising cemented carbide tiles correctly placed and embedded in metal surfaces of the products.

BRIEF DESCRIPTION OF DRAWINGS

In the following, embodiments herein will be described in greater detail by way of example only with reference to attached drawings, in which.

DETAILED DESCRIPTION OF PREFERRED EMBODIMENT OF THE INVENTION

In the following will be described some example embodiments of a method of producing a composite product 1 comprising cemented carbide tiles 2 embedded in a metal surface of the composite product 1.

The cemented carbide tiles 2 described herein may be used in casting of wear parts in equipment for mining and/or rock excavation, e.g. for crushing equipment such as cone crushers, jaw crushers or impact crushers.

Figure 1:
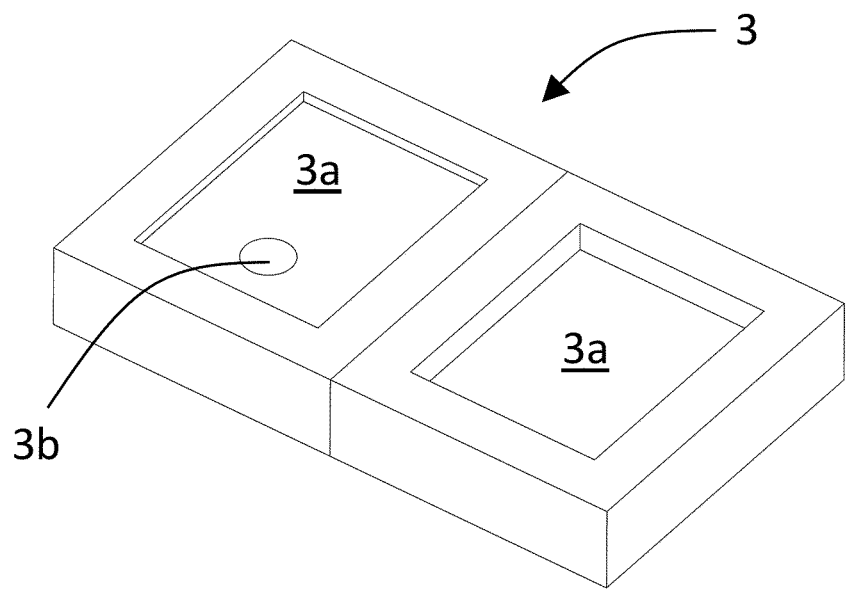
FIG. 1 illustrates schematically an open mould suitable for casting a composite product in accordance with the herein described method.

The proposed method is, as illustrated schematically in FIG. 1, based on the realization that in order to make fastening of cemented carbide tiles 2 to mould surfaces 3a more stable and robust during casting of composite products 1 it would be advantageous to have cemented carbide tiles 2 for such use having special adaptations to facilitate such stable and robust fastening. Such special adaptation is envisaged as through holes 2a or recesses 2b in the cemented carbide tiles 2 to accommodate and cooperate with fastening elements 4. The mould surfaces 3a are surfaces defining a moulding cavity, essentially corresponding to the geometry of the finished casted composite product 1.

As drilling or machining through holes 2a or recesses 2b in cemented carbide tiles is not viable due to the high cost and complexity of drilling or machining cemented carbides, because of its extreme hardness, it is envisaged herein cemented carbide tiles 2 having such through holes 2a or recesses 2b, a method of producing a composite product 1 comprising such cemented carbide tiles 2 embedded in a metal surface of the composite product 1 as well as a composite product 1 comprising cemented carbide tiles 2 embedded in a metal surface of the composite product 1.

Thus, envisaged herein is an improved method of producing a composite product 1 comprising cemented carbide tiles 2 embedded in a metal surface of the composite product 1.

The method comprises the process of preparing a mould 3, as schematically illustrated in FIG. 1, corresponding to a geometry of the composite product 1 to be produced. Such a mould 3 could e.g. be a sand mould 3 or a mould 3 by another suitable mould material.

Figure 2:
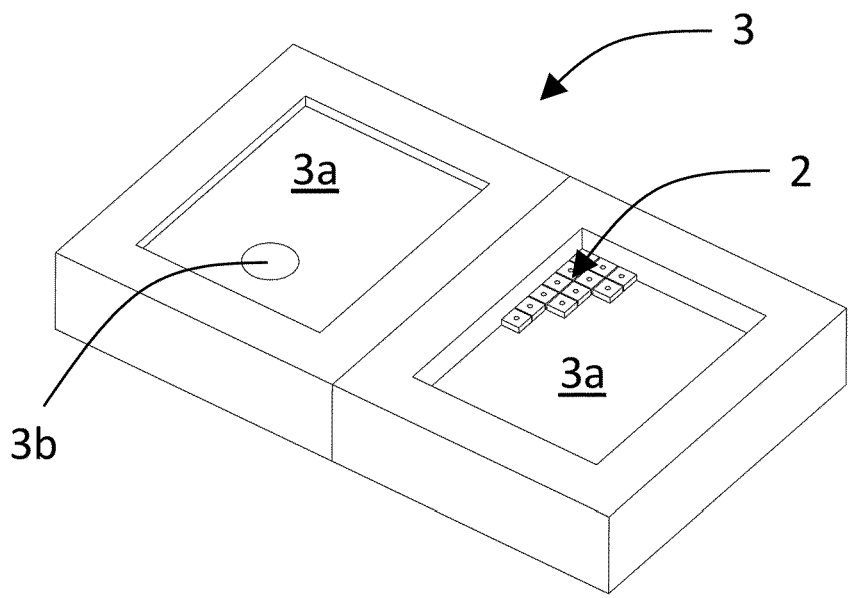
FIG. 2 illustrates schematically placement of cemented carbide tiles at desired surfaces of the mould.

As illustrated in FIG. 2, the method further comprises placing cemented carbide tiles 2 having through holes 2a or recesses 2b at desired surfaces 3a of the mould 3, such that an opening of each through hole 2a or recess 2b faces a mould surface 3a.

Figure 3:
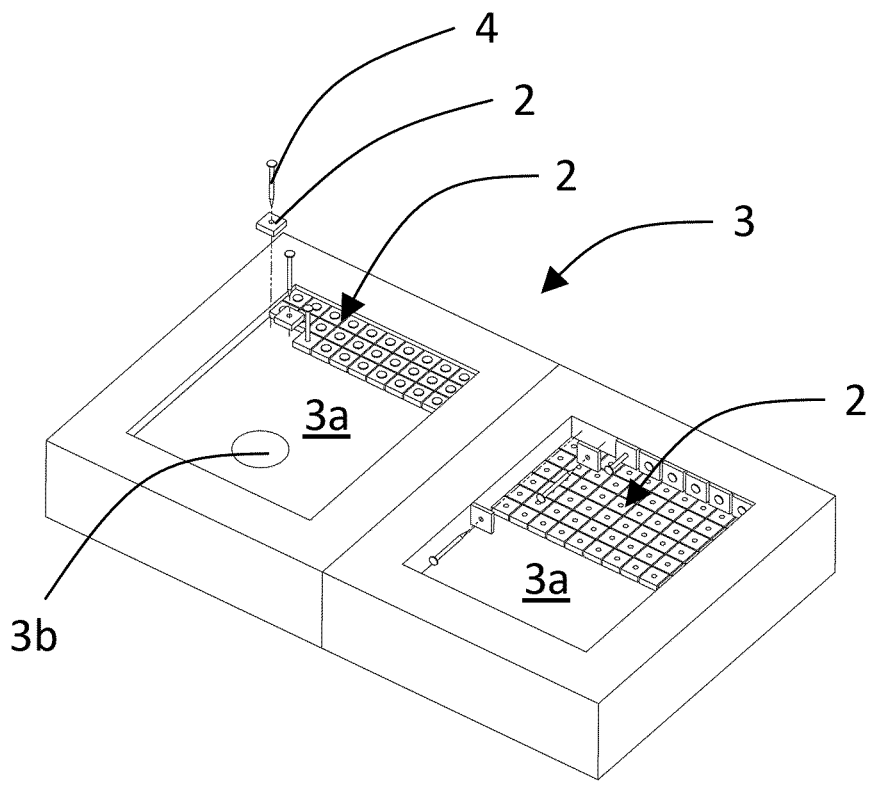
FIG. 3 illustrates schematically how the placed cemented carbide tiles are secured to the desired surfaces of the mould by fastening elements.

Upon placing the cemented carbide tiles 2 at the desired surfaces 3a of the mould 3, the method further comprises securing the cemented carbide tiles 2 to the desired surfaces 3a of the mould 3 by fastening elements 4, as illustrated in FIG. 3. The fastening elements 4 used having a first end section 4a and a second end section 4c and an elongated body 4b therebetween, such that the second end section 4c and at least part of the elongated body 4b of each respective fastening element 4 protrude out from said respective opening of each through hole 2a or recess 2b facing the mould surface 3a and into the material of the mould 3 to secure the respective cemented carbide tiles 2 in place.

Figure 7:
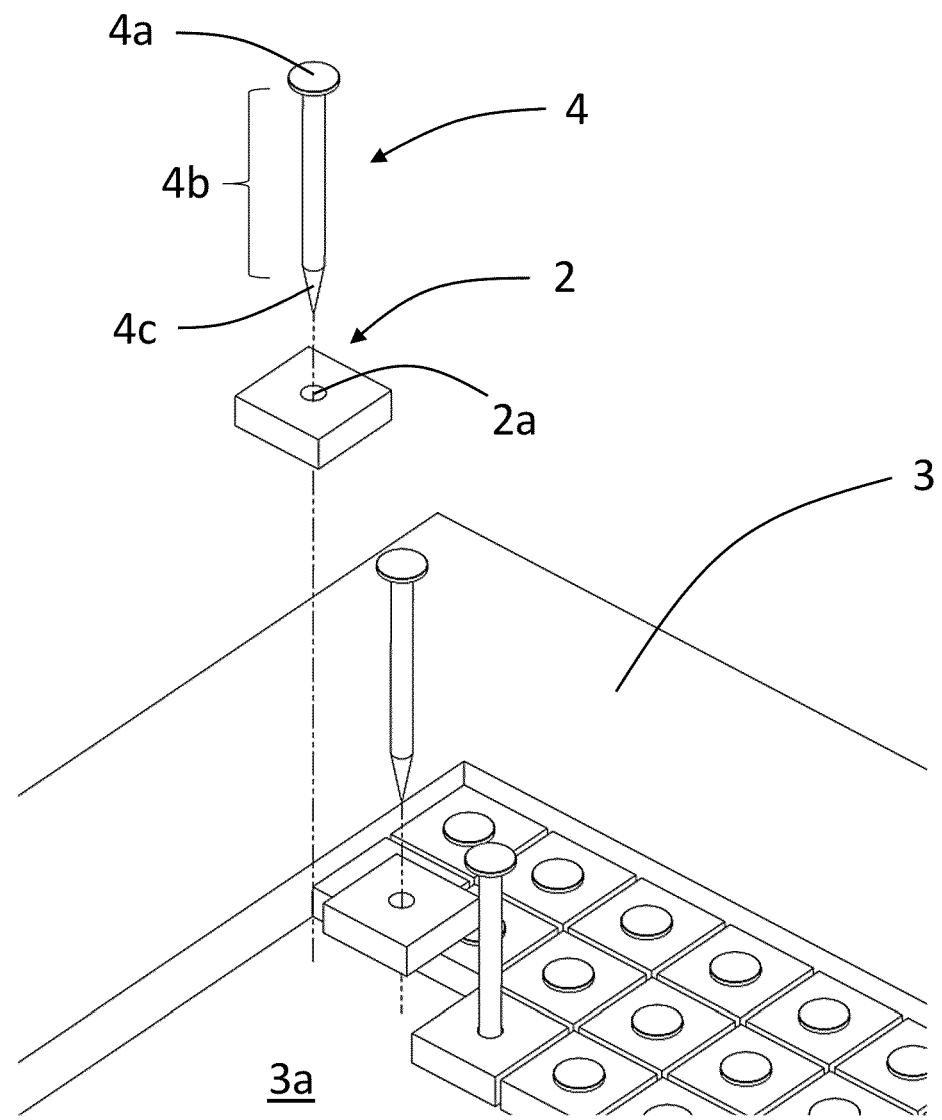
FIG. 7 illustrates schematically fastening of cemented carbide tiles to horizontal mould surfaces using nails with enlarged heads passed through respective holes of associated cemented carbide tiles and into the material of the mould.
Figure 8:
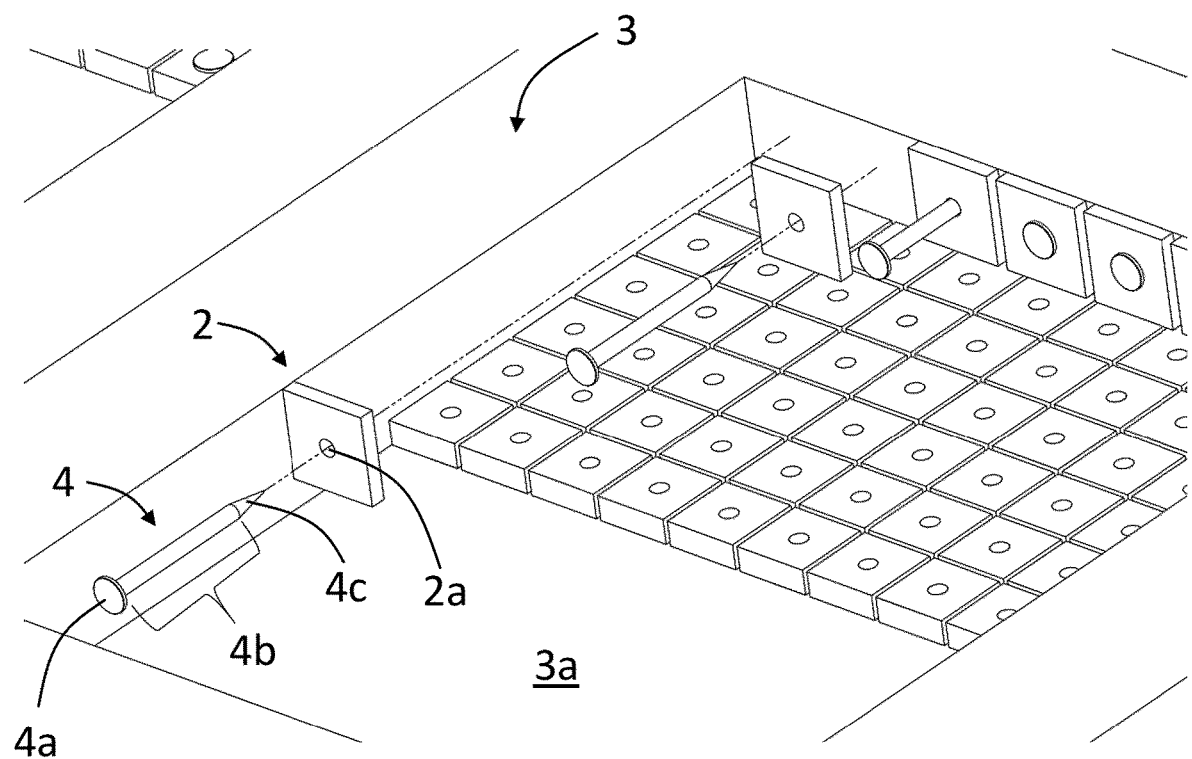
FIG. 8 illustrates schematically fastening of cemented carbide tiles to vertical mould surfaces using nails with enlarged heads passed through respective holes of associated cemented carbide tiles and into the material of the mould.
Figure 11A:
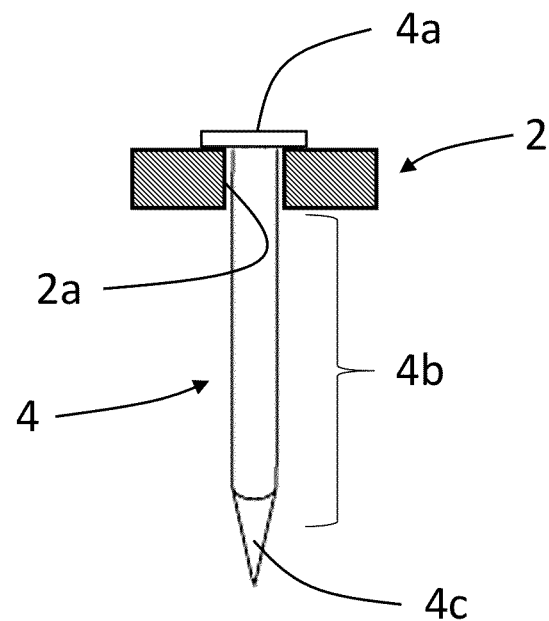
FIG. 11a illustrates schematically the use of fastening elements of a nail type with enlarged heads in combination with cemented carbide tiles having through holes.

When the cemented carbide tiles 2 have through holes 2a, as illustrated in FIGS. 7 and 8, the method comprises using fastening elements 4, as illustrated in FIG. 11a, where each respective first end section 4a has a cross-section exceeding a cross-section of an associated through hole 2a, such as nails with enlarged heads. The fastening in such cases comprises passing the second end section 4c of the respective fastening elements 4 through a respective hole 2a of an associated cemented carbide tile 2 and into the material of the mould 3, e.g. into the sand in case of a sand mould, to secure each respective fastening element 4, such that it is retained at the mould surface 3a by the first end section 4a and at least part of the elongated body 4b of the fastening element 4.

Figure 11B:
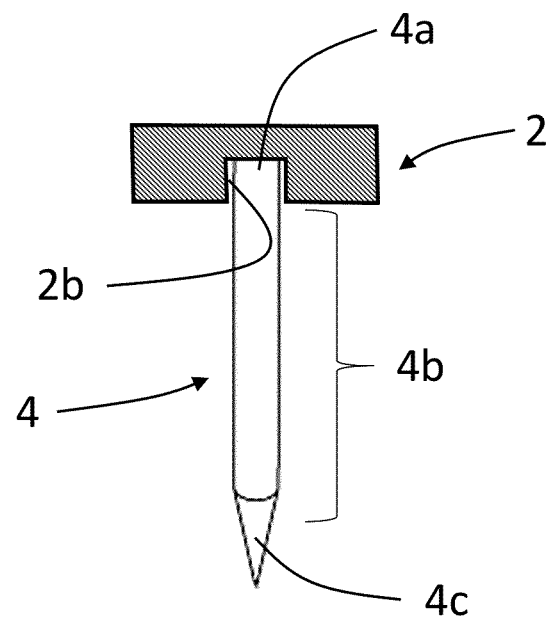
FIG. 11b illustrates schematically the use of fastening elements of pin type in combination with cemented carbide tiles having recesses.

In other embodiments, when the cemented carbide tiles 2 have recesses 2b, the method comprises using fastening elements 4, as illustrated in FIG. 11b, where each respective first end section 4a has a cross-section corresponding to a cross-section of a bottom of an associated recess 2b, and affixing a respective fastening element 4 at the bottom of an associated recess 2b by its first end section 4a, such that at least part of the elongated body 4b and the second end section 4c of the respective fastening element 4 protrude out of its respective recess 2b. The fastening in such cases comprises inserting at least part of the elongated body 4b and the second end section 4c of the respective fastening elements 4 into the material of the mould 3 to secure each respective fastening element 4, such that it and its associated cemented carbide tile 2 is retained at the mould surface 3a by the second end section 4c and at least part of the elongated body 4b of the fastening element 4.

Figure 4:
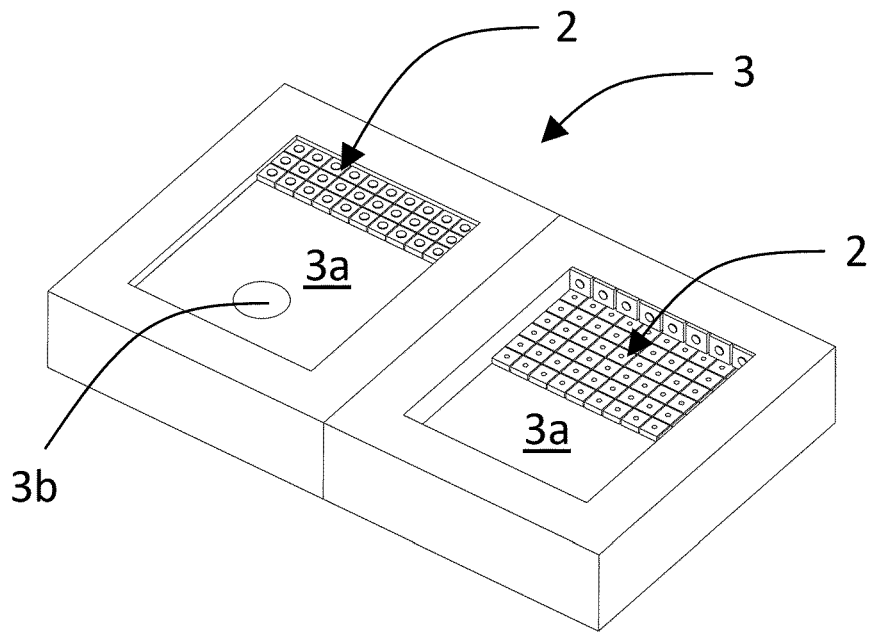
FIG. 4 illustrates schematically how cemented carbide tiles are secured at the desired surfaces of the mould.
Figure 5:
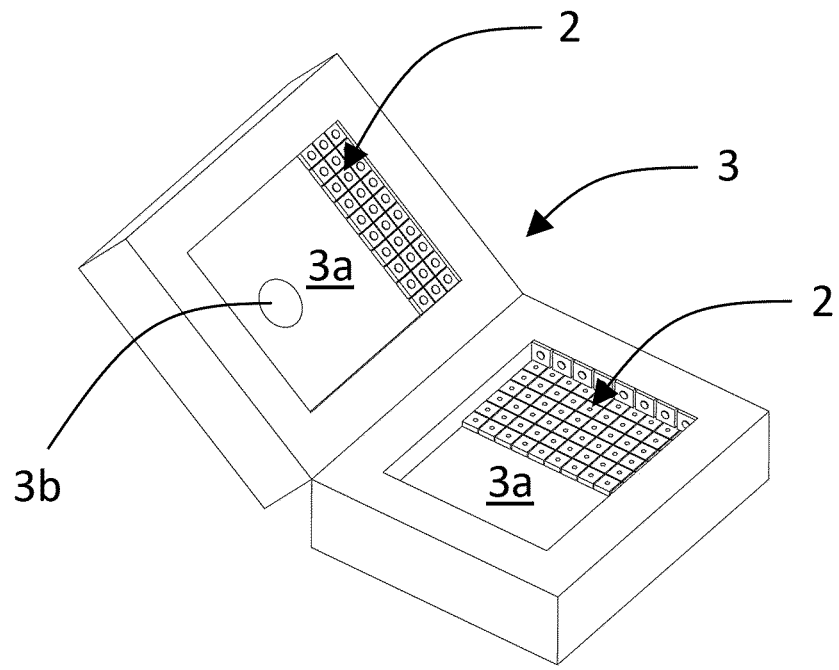
FIG. 5 illustrates schematically how the mould is closed in preparation of casting.
Figure 6:
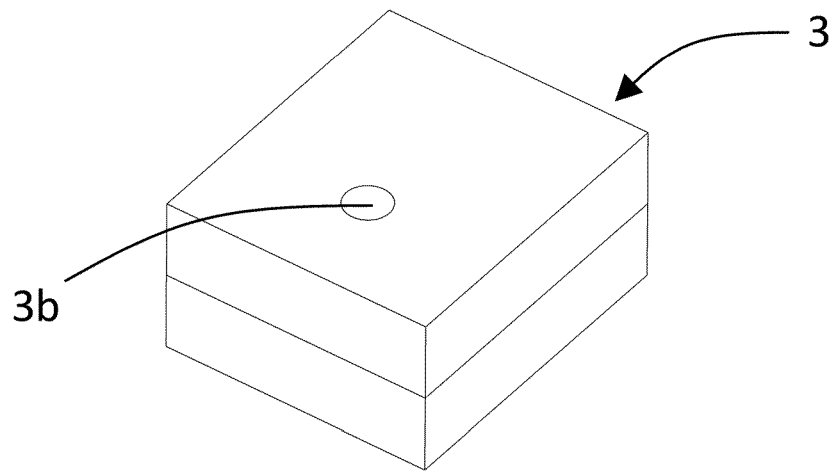
FIG. 6 illustrates schematically the closed mould with an inlet thereof facing upwards ready to receive molten metal for casting the composite product.
Figure 9:
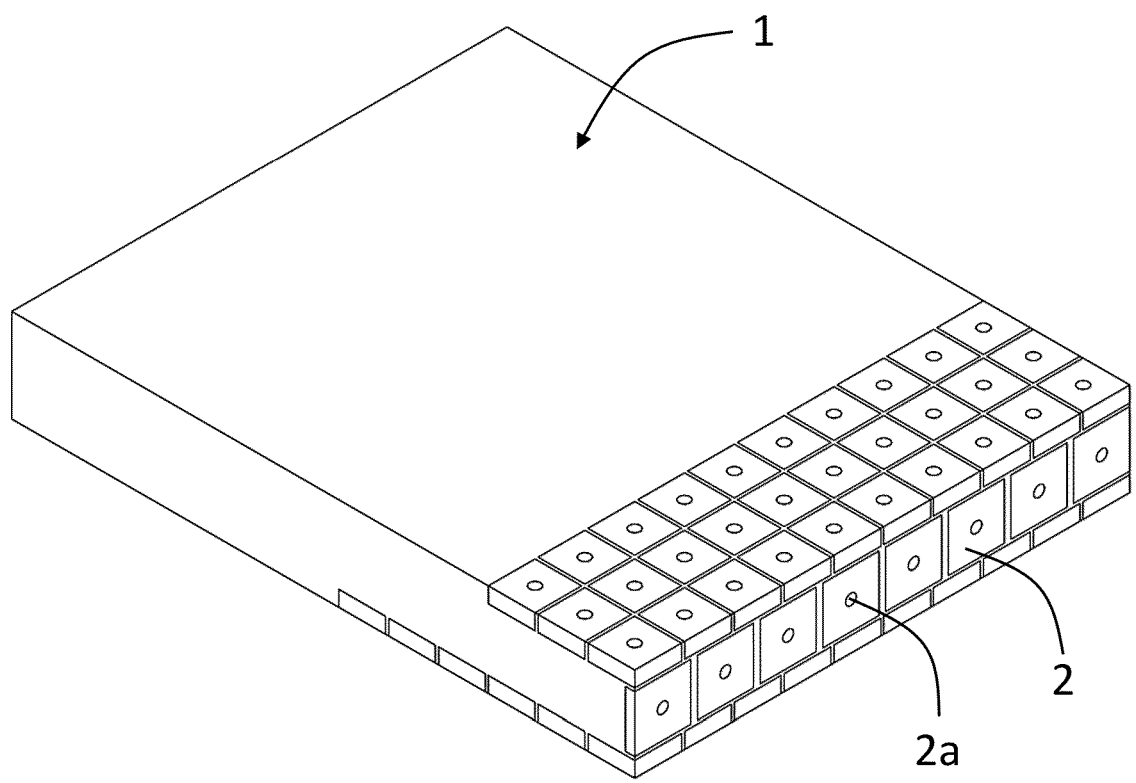
FIG. 9 illustrates schematically an example of a finished composite product.

Once all cemented carbide tiles 2 are secured at the desired surfaces 3a of the mould 3, as illustrated in FIG. 4, the mould 3 is closed, as illustrated in FIG. 5, such that form-halves of the mould 3 create a moulding cavity therebetween, in which the cemented carbide tiles 2 are correctly placed and secured. The method further comprises pouring molten metal into the closed mould 3 via an inlet 3b thereof, a simplified version of which is shown on the closed mould 3 as illustrated in FIG. 6, to cast the composite product. The method is finalized through removing the casted product 1 after solidification, thus rendering the finished composite product, an example of which is illustrated in FIG. 9. This is also known as shakeout according to known metal casting procedure. Any remnants of the fastening elements 4 may be cleared from the finished composite product 1 following removal thereof from the mould 3. This process is also known as fettling.

The metal used for moulding the composite product 1 may be a metal suitable for casting, such as iron, manganese steel, aluminium, magnesium or an alloy of such metals.

Thus, the above method allows for a stable and robust fastening of the cemented carbide tiles 2 that will decrease the risk of flushing considerably, if not eliminating the risk, thus increasing the yield and quality of the resulting composite product.

As drilling or machining through holes 2a or recesses 2b in cemented carbide tiles is not viable, as mentioned above, in some further embodiments the method comprises producing the cemented carbide tiles 2 having the through holes 2a or recesses 2b by the following process.

In accordance with this process, carbide and binder material powder is mixed and put into a tile shaped mould (not shown) having form elements to produce one or more through holes 2a or recesses 2b The mixed carbide and binder material powder is pressed in the tile shaped mould into forming a green body (not shown) having one or more through holes 2a or recesses 2b. The resulting green body is sintered, such that the binder melts and binds together the carbide forming a cemented carbide tile 2 having one or more through holes 2a or recesses 2b.

The carbide powder may e.g. comprise tungsten or niobium and the binder material powder often cobalt.

In an alternative embodiment of the method the cemented carbide tiles 2 having the through holes 2a or recesses 2b are produced by the process of mixing carbide and binder material powder and putting the mixed carbide and binder material powder into a tile shaped mould. This is followed by the subsequent pressing of the mixed carbide and binder material powder in the tile shaped mould into forming a green body, whereupon one or more through holes 2a or recesses 2b are machined in the green body, e.g. by drilling, milling or similar machining operation. This machining is possible as the green body, prior to sintering thereof, lacks the hardness rendered it by subsequent sintering. This machining is followed by sintering of the green body, such that the binder melts and binds together the carbide forming a cemented carbide tile 2 having one or more through holes 2a or recesses 2b.

In a still alternative embodiment of the method the cemented carbide tiles 2 having the through holes 2a or recesses 2b are produced by the process of mixing carbide and binder material powder and 3-D printing the mixed carbide and binder material powder into a tile shape green body having one or more through holes 2a or recesses 2b. This is followed by sintering the green body, such that the binder melts and binds together the carbide forming a cemented carbide tile 2 having one or more through holes 2a or recesses 2b.

Furthermore, is envisaged herein a cemented carbide tile 2 having one or more through holes 2a or recesses 2b and suitable for use in the above method.

In one embodiment such a cemented carbide tile 2 is obtainable by the process of mixing carbide and binder material powder and forming, from the mixed carbide and binder material powder, a tile shaped green body having one or more through holes 2a or recesses 2b. It is followed by sintering the tile shaped green body having the one or more through holes 2a or recesses 2b, such that the binder melts and binds together the carbide forming the cemented carbide tile 2 having the one or more through holes 2a or recesses 2b.

In one alternative embodiment the forming of the tile shaped green body having the one or more through holes 2a or recesses 2b further comprises putting the mixed carbide and binder material powder into a tile shaped mould that has form elements to produce one or more through holes 2a or recesses 2b. This is followed by pressing the mixed carbide and binder material powder into forming the tile shaped green body having the one or more through holes 2a or recesses 2b, from which green body the cemented carbide tile 2 is obtainable by the subsequent sintering thereof.

In another alternative embodiment the forming of the tile shaped green body having the one or more through holes 2a or recesses 2b further comprises putting the mixed carbide and binder material powder into a tile shaped mould and pressing the mixed carbide and binder material powder into a tile shaped green body. This is followed by machining one or more through holes 2a or recesses 2b in the tile shaped green body thus forming the tile shaped green body having the one or more through holes 2a or recesses 2b, from which green body the cemented carbide tile 2 is obtainable by the subsequent sintering thereof.

In a further alternative embodiment the forming of the tile shaped green body having the one or more through holes 2a or recesses 2b further comprises: 3-D printing the mixed carbide and binder material powder into forming the tile shaped green body having the one or more through holes 2a or recesses 2b, from which green body the cemented carbide tile 2 is obtainable by the subsequent sintering thereof.

Still further is envisaged herein a cemented carbide tile 2, that has a tile shaped body with one or more through holes 2a or recesses 2b, which tile shaped body is formed from a sintered tile shaped carbide and binder material powder mixture green body having the one or more through holes 2a or recesses 2b.

Figure 10A:
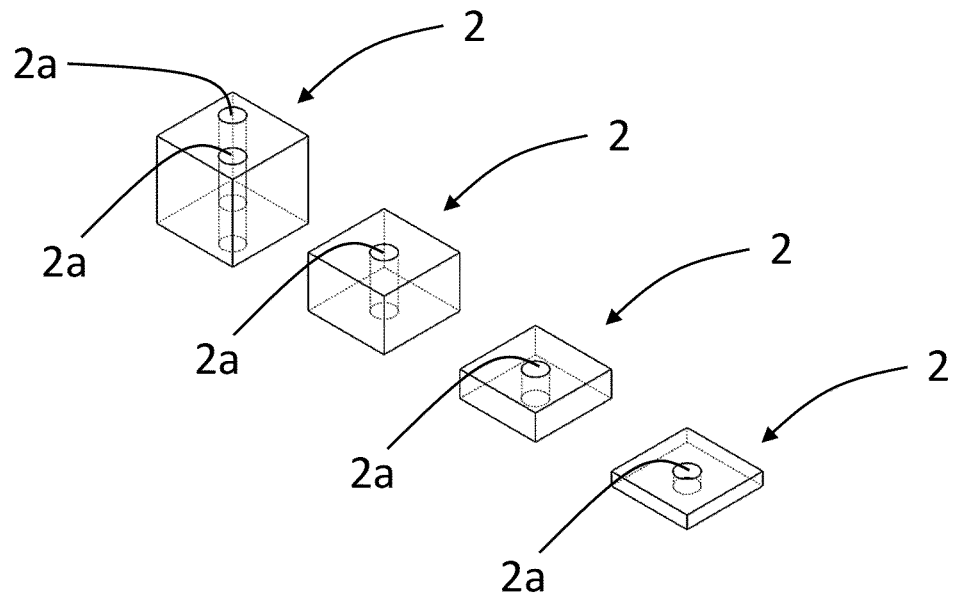
FIG. 10a illustrates schematically some examples of rectangular cemented carbide tiles with through holes.
Figure 10B:
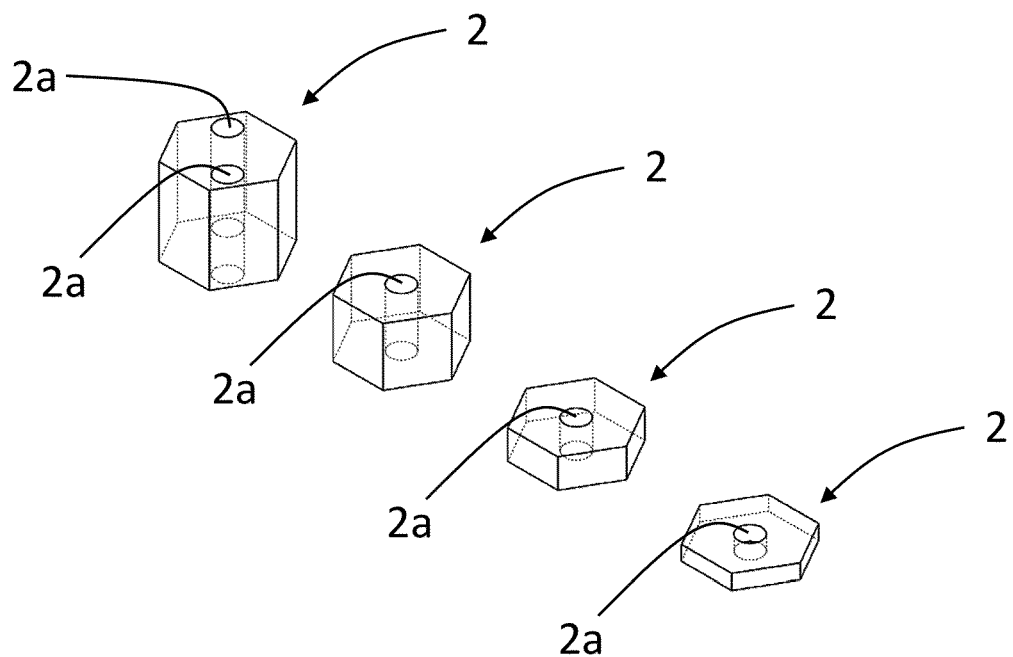
FIG. 10b illustrates schematically some further examples of hexagonal cemented carbide tiles with through holes.
Figure 10C:
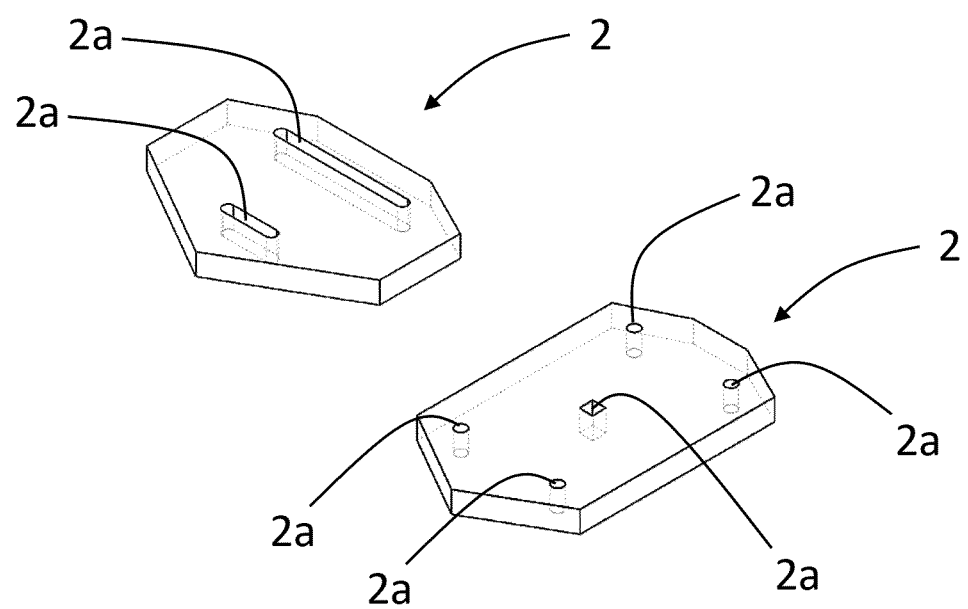
FIG. 10c illustrates schematically yet other examples of cemented carbide tiles with through holes of arbitrary geometries.

The cemented carbide tiles 2 described herein may be given arbitrary geometries and thicknesses and suitable numbers of through holes 2a or recesses 2b for receiving fastening elements 4. The cemented carbide tiles 2 may, as illustrated in FIG. 10a, be rectangular and of different thicknesses and having one or more through holes 2a or recesses 2b. Alternatively, as illustrated in FIG. 10b, the cemented carbide tiles 2 may also be hexagonal and of different thicknesses and having one or more through holes 2a or recesses 2b. Furthermore, as illustrated in FIG. 10c, the cemented carbide tiles 2 may have other, arbitrary, geometries and thicknesses and the through holes 2a or recesses 2b may be circular, rectangular or elongated, all as appropriate for facilitating stable and secure fastening to a mould surface 3a.

Additionally, it is envisaged herein a composite product 1 comprising cemented carbide tiles 2 embedded in a metal surface of the composite product 1 that is obtainable by the above method.

According to embodiments herein is thus provided a composite product 1 comprising cemented carbide tiles 2 embedded in a metal surface of the composite product; that comprises cemented carbide tiles 2 having one or more through holes 2a or recesses 2b embedded in desired metal surfaces of the composite product, such that an opening of each respective through hole 2a or recess 2b faces outwards from the composite product 1 surface.

Some of the above embodiments have the beneficial effects of providing for correct placement and fastening of cemented carbides in moulds 3 prior to casting of composite products 1 comprising cemented carbide tiles 2 embedded in metal surfaces of the products 1, increasing the yield of correctly casted high-performance composite products 1.

Other of the above embodiments have the beneficial effects of providing for cemented carbide tiles 2 enabled to be placed and fastened correctly in moulds 3 prior to casting of composite products 1 comprising cemented carbide tiles 2 embedded in metal surfaces of the products 1, also enabling an increase in the yield of correctly casted high-performance composite products 1.

Still some of the above embodiments have the beneficial effects of providing for high-performance composite products 1 comprising cemented carbide tiles 2 correctly placed and embedded in metal surfaces of the products 1.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of producing a composite product including cemented carbide tiles embedded in a metal surface of the product, the cemented carbide tiles having through holes or recesses, the method comprising the steps of:
- preparing a mould corresponding to a geometry of the product;
- placing the cemented carbide tiles at desired surfaces of the mould, such that an opening of each through hole or recess faces a mould surface, and upon placing the cemented carbide tiles securing the cemented carbide tiles to the desired surfaces of the mould by fastening elements, each of the fastening elements having a first end section and a second end section and an elongated body therebetween, such that the second end section and at least part of the elongated body of each respective fastening element protrudes out from a respective opening of each through hole or recess facing the mould surface and into a material of the mould to secure the respective cemented carbide tile in place;
- pouring molten metal into the mould to cast the composite product; and
- removing the casted composite product after solidification.

2. The method according to claim 1, further comprising using, when the cemented carbide tiles have through holes, the fastening elements, where each respective first end section has a cross-section exceeding a cross-section of an associated through hole, and wherein the securing step includes passing the second end section of the respective fastening elements through a respective hole and into the material of the mould to secure each respective fastening element, such that it is retained at the mould surface by the first end section and at least part of the elongated body of the fastening element.

3. The method according to claim 1, further comprising using, when the cemented carbide tiles have recesses, the fastening elements, where each respective first end section has a cross-section corresponding to a cross-section of a bottom of an associated recess, and affixing a respective fastening element at the bottom of an associated recess by its first end section, such that at least part of the elongated body and the second end section of the respective fastening element protrude out of its respective recess, and wherein the securing step includes inserting at least part of the elongated body and the second end section of the respective fastening elements into the material of the mould to secure each respective fastening element, such that it is retained at the mould surface by the second end section and at least part of the elongated body of the fastening element.

4. The method according to claim 1, further comprising producing the cemented carbide tiles having the through holes or recesses by the process of:
- mixing carbide and binder material powder;
- putting the mixed carbide and binder material powder into a tile shaped mould having form elements to produce one or more through holes or recesses and pressing the mixed carbide and binder material powder into forming a green body having one or more through holes or recesses; and
- sintering the green body such that the binder melts and binds together the carbide forming the cemented carbide tile having one or more through holes or recesses.

5. The method according to claim 1, further comprising producing the cemented carbide tiles having the through holes or recesses by the process of:
- mixing carbide and binder material powder;
- putting the mixed carbide and binder material powder into a tile shaped mould and pressing the mixed carbide and binder material powder into forming a green body;
- machining one or more through holes or recesses in the green body; and
- sintering the green body such that the binder melts and binds together the carbide forming the cemented carbide tile having one or more through holes or recesses.

6. The method according to claim 1, further comprising producing the cemented carbide tiles having the through holes or recesses by the process of:
- mixing carbide and binder material powder;
- 3-D printing the mixed carbide and binder material powder into a tile shaped green body having one or more through holes or recesses; and
- sintering the green body such that the binder melts and binds together the carbide forming a cemented carbide tile having one or more through holes or recesses.

* * * * *